Figure 1:
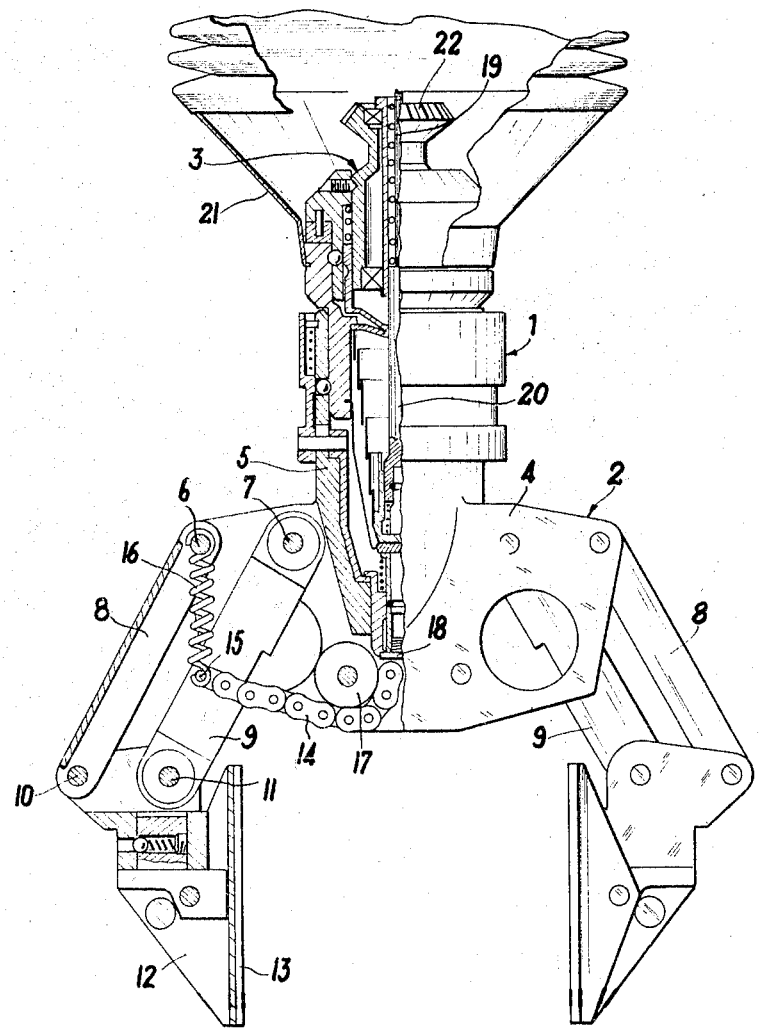

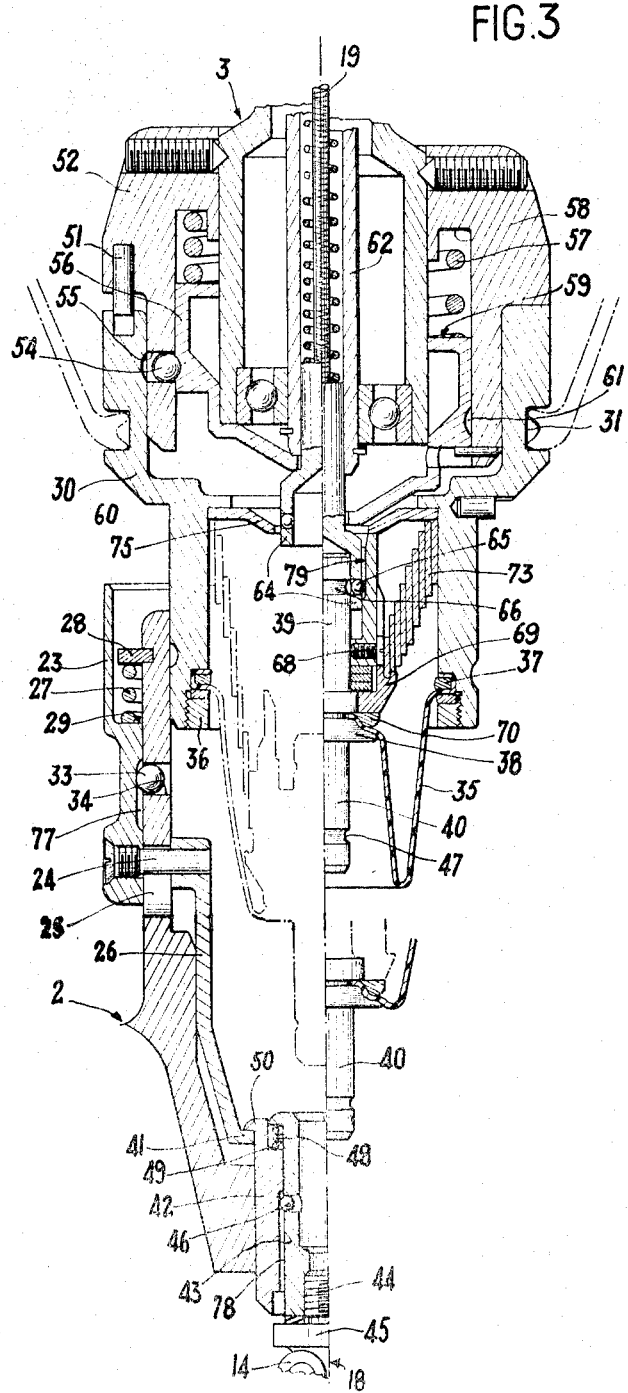

United States Patent Office 3,289,485
Patented Dec. 6, 1966

3,289,485
LEAK-TIGHT COUPLING DEVICE FOR
MASTER-SLAVE MANIPULATOR
Jean-Pierre Cazalis, Bezons, Guy Lefort, Paris, and Joseph
Rouillard, Nantes, France, assignors to Commissariat
a l'Energie Atomique, Paris, France
Filed July 8, 1965, Ser. No. 470,479
Claims priority, application France, July 24, 1964,
983,001
6 Claims. (Cl. 74—18.2)

This invention relates to a device which can be disassembled and which provides a leak-tight coupling between the grab of a master-slave manipulator and its control arm. By means of this device, it is possible in particular to carry out any operation involving disassembly of the grab and/or the control arm without interrupting the continuity of leak-tightness which is provided by a protection hose secured on the one hand to said coupling device and on the other hand to the internal wall of a handling cell by extending the opening formed in the wall of said cell for the passage of said arm.

One particular design solution among those which are at present in use consists in the interposition of a flexible membrane or diaphragm between a push-rod and a member for transmitting rectilineal motion, a spring being provided for the purpose of maintaining these two members continuously in contact through the membrane. Among other disadvantages, this solution permits of operation only when a movement of thrust is applied. Furthermore, the use of an equalizer spring reduces the efficiency of such a transmission to an appreciable degree.

Another conventional solution consists in separting the grab from its control arm by connecting this latter through a flexible protection member which completely surrounds the manipulator arm. The disadvantages involved in this case can readily be visualized and arise in particular from the fragile nature of the flexible protection member which is clamped between two metal parts connectable to each other; furthermore, it usually proves impossible to disassemble the components inside the handling cell itself.

Finally, a last solution which is essentially intended to be applied to master-slave manipulators in which the movements of said manipulators are assisted and retransmitted by a shaft and gearing system, consists in uncoupling the master-slave manipulator by making use of bevel-gears, leak-tightness being ensured by means of bushings or O-ring seals and completed by means of oil films between said seals. However, it is necessary in accordance with this solution to render the arm proper independent of its control system; in addition, the remote handling of this coupling system is very difficult since all of the bevel pinions must correspond to each other tooth by tooth. Finally, the arm itself is practically not protected from the atmosphere which prevails within the cell, thereby entailing the danger either of causing rapid damage by corrosion or a high level of contamination of the entire equipment.

The object of the present invention is to overcome the disadvantages summarized above by virtue of a simple and sturdy coupling device which can be entirely controlled from a distance and which makes it possible, by means of a suitable conversion of the means by which the grab is connected to its arm, to replace a part of the flexible protection sleeve or hose which surrounds this latter by a leak-tight mechanical unit which can readily be put in position or removed.

To this end, said device for providing a leak-tight coupling between the handling grab of a master-slave manipulator and its control arm, wherein the movements of the grab jaws are carried out by means of a traction cable which passes axially through said arm, is characterized in that said device comprises an intermediate bushing on which is fixed externally a flexible protection hose surrounding said arm, said bushing being made fast at the lower end thereof with a flexible diaphragm designed to support axially of said arm a coupling member provided with two cylindrical extensions on each side of said diaphragm, said bushing being partly engaged within a casing constituting the grab body and locked in said casing by means of a first set of balls which are adapted to cooperate with an annular sleeve which surrounds said casing externally thereof, a transmission member which is secured to said annular sleeve by means of grub-screws which traverse said casing through lateral slots, a bottom locking-unit body which rests on a shoulder provided at the extremity of said transmission member and which secures said transmission member to the lower extension of said coupling member by means of a socket and a second set of balls, a top locking-unit body engaged within the extremity of the bushing and securing said bushing to the extremity of said arm by means of a third set of balls and an internal ring, said control cable having an extension in the form of a rigid rod which is coupled by means of a fourth set of balls and an annular retaining flange to the upper extension of said coupling member.

Aside from this main characteristic feature, the sealing device in accordance with the invention has a number of different secondary characteristic features which will be described in greater detail hereinafter and which relate especially to the following points:

said annular sleeve delimits between said sleeve and the external surface of the cylindrical casing a recess for a restoring spring which is applied at one end against a bearing surface formed within said sleeve and at the other end against a stationary annular flange which forms part of said casing.

said annular sleeve is provided in the internal surface thereof with a recess so as to permit the balls of the first set to escape in the disengaged position resulting from the sliding motion of said ring against the external surface of said casing, said disengagement of the balls of the first set being intended to take place simultaneously with the disengagement of the balls of said second set by means of said transmission member;

said rod which forms an extension of said control cable is provided with a cylindrical end cap which is adapted to fit over the upper extension of the coupling member;

said bushing is integral with a bearing ring which produces the disengagement of said rod as a result of traction applied to the cable and the disengagement of said angular retaining flange as a result of escape of the balls of the fourth set;

said bearing ring constitutes an abutment for said cylindrical cap so as to produce the disengagement of said bushing from the top locking-unit body as a result of escape of the balls of the third set.

Figure 2:
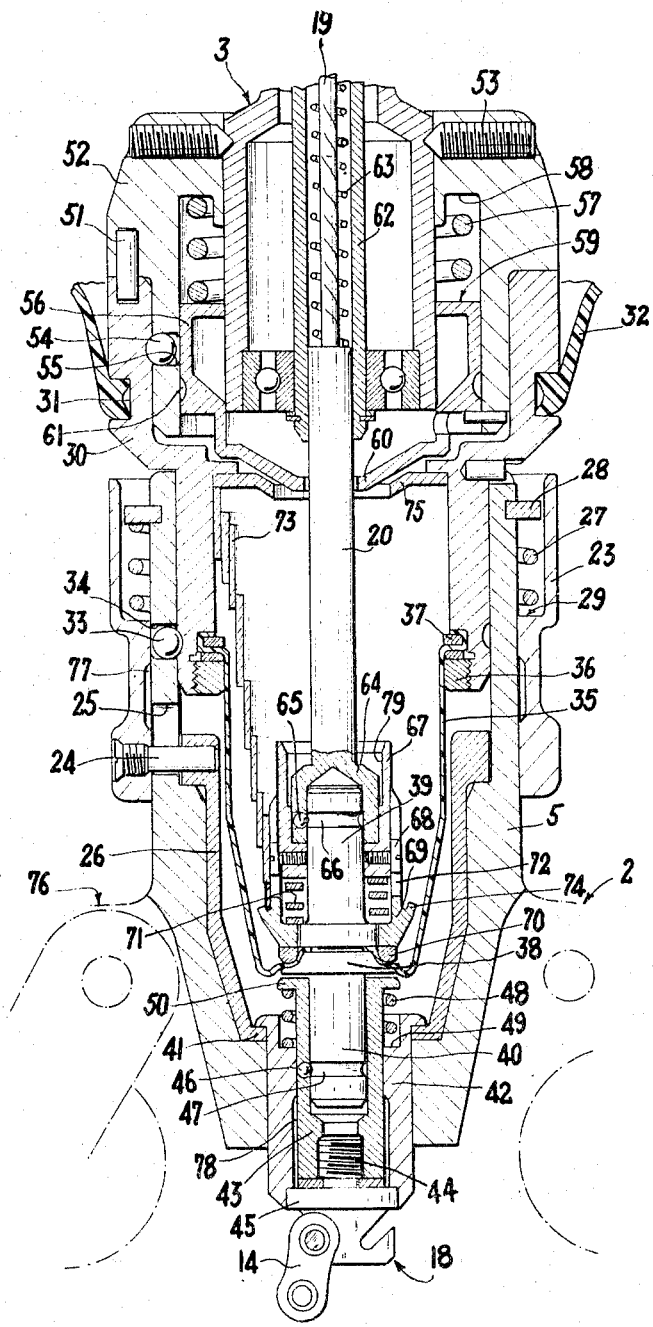

Further characteristic features of the device which is proposed will further become apparent from a perusal of the following description of one example of embodiment which is given by way of indication and not by way of limitation, reference being made to the accompanying drawings, in which:

FIG. 1 is a diagrammatic view in partial vertical cross-section of the device in accordance with the present invention for providing a leak-tight coupling between the grab of a master-slave manipulator and the extremity of the control arm of said manipulator, FIG. 2 is a view in cross-section on a larger scale of the different components employed in the construction of said coupling device, FIG. 3 is a view in cross-section of the device which serves to illustrate diagrammatically the successive stages of interlocking of said components.

As can be seen from FIG. 1, the coupling device considered, which is generally designated by the reference numeral 1, is designated for the purpose of coupling in a leak-tight manner the grab 2 of a master-slave manipulator to the control arm 3 of this latter. Said grab essentially consists of a grab body 4 which has an extension at the top portion thereof in the form of a cylindrical casing 5. Pivoted to the body 4 about pivot-pins such as the pins 6 and 7 are link-arms which are designated respectively by the reference numerals 8 and 9. At the extremities of said link-arms, there are also mounted on pivot-pins such as the pins 10 and 11 two jaws such as the jaw 12 each fitted with a shoe 13 and designed especially for handling any objects inside a viewing cell.

The control of the opening or closing movements of the jaws 12 is carried out by means of chain elements 14 which are secured at one end to a stud 15 carried by each link-arm 9, a restoring spring 16 being mounted between said stud 15 and the articulation 6 of the link-arm 8 which is parallel to the corresponding link-arm 9 as shown in the figure.

The chain element 14 which can be seen in the drawings is guided by a roller 17 before being connected, by means of a member 18 which will be described in constructional detail later, to the lower portion of the control arm 3 of the grab. To this end, the arm is traversed axially by a traction cable 19 which has an extension in the form of a rod 20 so that the forces which are exerted axially on said cable within the control arm produce the pivotal motion of the link-arms 9 under the action of the chain elements 14 and consequently initiate the closing or, conversely, the opening of the grab jaws 12.

There can be observed in FIG. 1 the presence of a flexible protection hose 21 which surrounds the control arm 3. Only the lower end of said hose is shown in the figure, the other end being fixed to the wall of the viewing cell into which the master-slave manipulator arm penetrates. Said protection hose provides an extension to the opening through which the arm passes within the wall of said cell and ensures protection against radio-active particles which are present in the atmosphere of said cell.

Finally, it can be observed that the end of the arm 3 is fitted with a bevel pinion 22 whereby the entire grab unit can be caused to rotate about its axis.

The sectional view which is shown in FIG. 2 serves to explain in detail the constructional arrangement proper of the coupling device which is mounted between the extremity 3 of the arm and the grab body 4. As can be seen from this figure, the cylindrical casing 5 which forms an extension of the grab body 4 is surrounded at the top portion thereof by an annular sleeve 23 which is secured to a member 26 by means of threaded studs or grub-screws 24 which pass through elongated slots 25 formed laterally in the body of the casing 5, said member 26 being mounted inside said casing and adapted to slide axially within this latter. It should be noted that the position of the annular sleeve at a time of normal operation is determined by means of a spring 27 which is applied at one end against an annular flange 28 carried by the external surface of the casing 5 and at the other end against a shoulder 29 formed inside the sleeve 23, the action of said spring being intended to thrust back the sleeve in such a manner that the grub-screws 24 come into abutment against the bottom of the elongated slots 25 formed in the body 5.

A cylindrical bushing 30 is engaged within the top portion of the casing 5 and is provided in the external surface thereof with a channel 31 in which is fitted the extremity 32 of the flexible protection hose 21 which is illustrated in FIG. 1.

The bushing 30 is locked within the casing 5 by means of a first set of balls such as the ball 33 which are fitted within recesses 34 of the body of the casing 5 and maintained within said recesses by the internal wall of the annular sleeve 23.

At the bottom portion thereof, the bushing 30 supports a deformable membrane or diaphragm 35 which is made fast with the extremity of the bushing 30 by means of a fixing nut 36 and a washer 37 which clamps the end of said membrane in a double fold so as to ensure perfect leak-tightness. The bottom portion of the diaphragm 35 is in turn made fast with a member 38, or so called coupling member, which comprises respectively an upper extension 39 and a lower extension 40, the functions of which will be explained in detail below.

The transmission member 26 which is secured to the annular sleeve 23 is provided at the bottom portion thereof with an annular flange 41 on which a cylindrical element 42 or so-called bottom locking-unit body is intended to rest. Within said body is slidably mounted a socket 43 in which is axially fitted the extension 40 of the coupling member 38. As can be clearly seen from FIG. 2, the lower extremity of the socket 43 is provided with a threaded portion in which is screwed a stud 44 which forms one piece with a plate 45. Attached to said plate are the elements of the chain 14 which, as has already been explained earlier, serves to effect the opening or closing of the grab jaws. The complete assembly of members 44 and 45 constitutes the member 18 which has been referred to above.

The locking of the extension 40 in the socket 43 is carried out by means of a second set of balls such as the ball 46 which is imprisoned between the internal wall of said socket and a circular groove 47 formed in the external surface of the extension 40. The relative positions of the different members mentioned above is determined, during normal operation, by virtue of the action of an oppositely acting spring 48 which is disposed between a shoulder 49 of the locking-unit body 42 and a top annular flange 50 of the socket 43.

The top portion of the bushing 30 is connected by means of dowel-pins 51 to a member 52 or so-called top locking-unit body. Said body 52 is in turn secured by means of screws such as the screw 53 to the lower end 3 of the grab control arm, the locking of the locking-unit body in the bushing 30 being carried out by means of a third set of balls such as the balls 54 which are set in recesses 55 provided in the locking-unit body and maintained within said recesses by the external surface of an internal ring 56 which is adapted to slide axially inside the body 52. The assembly described above is maintained in the locking position by means of a spring 57 which is intended to bear at one end against a bearing surface 58 of the locking-unit body 52 and, at the other end, against the top extremity 59 of the internal ring 56. Said ring has an extension at the lower end in the form of a flange or end-plate 60 which is intended to serve as an abutment as will become clear later so that, by compressing the spring 57, the balls 54 are released and permitted to escape into recesses 61 which are formed in the body of the internal ring 56.

FIG. 2 also shows the traction cable 19 which controls the operation of the grab jaws as well as the rod 20 which forms an extension of said cable, said rod being adapted to slide within a tube 62 which is integral with the arm 3 while being subjected to the opposing action of a spring 63 placed around the cable 19.

The rod 20 terminates at the lower end in a cap 64 which serves to lock said rod onto the extension 39 of the coupling member 38, said locking action being carried out by means of a fourth set of balls such as the ball 65 which are maintained between a groove 66 formed in the surface of the extension 39 and an annular retaining flange 67. Said flange is secured by means of screws 68 to a cylindrical end-piece 69 which serves to maintain the flexible diaphragm 35 against the coupling member 38 by means of a protective washer 70. A spring 71 is mounted between the annular flange 67 and the base of the end-piece 69, the heads of said screws 68 being adapted to slide within elongated slots 72 formed in the surface of the end-piece 69. Finally, a spring 73 is mounted on assembly inside the diaphragm 35 between a flange 74 of the end-piece 69 and an abutment 75 which is integral with the internal wall of the bushing 30.

The operation of the coupling device in accordance with the invention can be deduced from the description of its different components which has just been given.

By completely releasing the traction cable 19, the grab is set in its natural fully-open position under normal operating conditions; even in this position, the locking unit 42 does not rest on the flange 41 of the transmission member 26.

It will now be assumed, for example, that it is desired to disconnect the grab from the control arm, these two elements being shown assembled together in FIGS. 1 and 2.

In order to carry out this separation, the jaws of the grab are first opened to their maximum extent by releasing the traction 19 completely, and by effecting an additional opening of the grab jaws by means of a special support which has not been illustrated in the drawings.

By means of this movement which is transmitted by the chain elements 14 to the plate 45 and consequently to the locking-unit body 42, said body comes to rest, as shown in FIG. 2, on the flange 41 of the transmission member 26. In this position, the disassembly of the grab body 4 proper is then carried into effect as follows: a wedge of suitable shape (which has been shown in the drawings) is engaged within the viewing cell between the top edge 76 of the grab body 4 and the annular sleeve 23 in such a manner as to initiate the displacement of this latter towards the top of the casing 5 while producing the compression of the restoring spring 27. There naturally corresponds to this displacement of the sleeve 23 an identical displacement of the transmission member 26 which is connected thereto by means of the grub-screws 24 through the elongated slots 25 which are formed in the casing 5.

The locking-unit body 42 is therefore also thrust upwards by the flange 41 of the transmission member 26 and slides over the socket 43 while compressing the restoring spring 48. As the movement of the sleeve 23 and the transmission member 26 continues, the balls 33 on the one hand and the balls 46 on the other hand of the first and second sets of balls respectively are brought, practically at the same moment, opposite the recesses 77 and 78 respectively which are hollowed out in the internal wall of the annular sleeve 23 and the locking-unit body 42. This consequently permits said balls to escape, thus automatically releasing the member and disengaging on the one hand the casing 5 from the bushing 30 and, on the other hand, the socket 43 from the bottom extension 40 of the coupling member 38. The entire assembly consisting of the grab body 4 is thus separated from the coupling member 38 and the bushing 30 without any action being produced on the sealing diaphragm 35. The process of disassembly which has been described above is illustrated diagrammatically in the bottom left hand portion and bottom right hand portion of the arrangement shown in FIG. 3 in two successive steps.

Once the grab body has been removed in the manner which has just been set forth, the disengagement of the control arm 3 itself from the bushing 30 is then carried into effect. Accordingly, there is exerted on the cable 19 a tractive effort which is directed towards the top of the arm, thus producing at the same time as the compression of the spring 73 which is housed inside the diaphragm 35 the displacement of the end-piece 69 until the upper extremity of the annular retaining flange 67 is applied in contact with the abutment 75 which is integral with the internal wall of the bushing 30 (as shown in the central portion of the arrangement which is illustrated in FIG. 3). If a greater tractive effort continues to be exerted on the cable 19, there is accordingly produced the compression of the spring 71 and the displacement of the screws 68 within the elongated slots 72 formed in the external surface of the end-piece 69. Under these conditions, the locking balls 65 of the fourth set which serves to secure the extension 39 of the coupling member 38 to the cap 64 which terminates the rod 20 are rapidly brought opposite the recess 79 formed at the top portion of the retaining flange 67. Thereupon, the extension 39 is released from the cap 64 (as shown in the top left hand portion of FIG. 3). The spring 73 expands, the coupling member 38 and the diaphragm 35 return to their initial positions.

If an effort continues to be exerted on the cable 19 and still in the same direction, the top portion of the cap 64 is then brought into contact with the end-plate 60 of the ring 56 which is mounted inside the top locking-unit body 52. The compression of the spring 57 is then initiated and, after the ring 56 has thus been displaced to a certain extent, the recesses 55 and 61 are brought into oppositely facing relation, thereby permitting the balls 54 of the third set to escape. The top locking-unit 52 is then disengaged and consequently the extremity of the control arm 3 is disengaged from the bushing 30, thus making it possible to withdraw the entire arm whilst the bushing remains suspended from the extremity 32 of the protection hose 21, leak-tightness being continuously maintained through said hose 21, the body of the bushing 30, the diaphragm 35 and the coupling member 38, irrespective of the tractive efforts exerted on the jaw-control cable.

The re-assembly of the different components is carried out in an order which is exactly the reverse of that which has been described in the case of disassembly. In fact, by progressively releasing the cable 19, the top locking-unit body is first of all coupled with the bushing 30 by means of the balls 54, then the end cap 64 of the rod 20 and the extension 39 of the coupling member 38 with the balls 65, if said extension 39 of the coupling member 38 is re-assembled at the same time from the exterior. The bottom extension 42 and the bushing 30 are brought in the same movement into the casing 5, whilst the re-coupling of the grab body 4 itself by means of the balls 46 and 33 is in turn effected by withdrawing the wedge which had lifted the annular sleeves 23 and 42. Final keying is obtained by removing the grab from its special support.

Among the advantages obtained by the coupling device in accordance with the invention, it should be noted that the intermediate diaphragm which ensures leak-tightness and also the complete protection hose unit are not in contact with any mechanical device which is liable to cause damage thereto.

It should also be noted that, in addition to the simplicity of design which is achieved, the basic concept of the principle of operation is such that the different locking and unlocking operations can be carried out only by operating the cable which controls the grab jaws in a zone which is located entirely outside that which corresponds, in the assembly position, to the normal movements of said jaws. In fact, the movements of the annular retaining flange 67 and of the cap 64 as these latter are applied in contact with the abutments 75 and 60 can take place only in the case of a tractive effort exerted on the cable 19 which is permitted only when the grab body has previously been removed. The operation of the device therefore has its own safety arrangements by virtue of the design of its different components, thereby preventing any mishandling by an operator.

As will be understood, the invention is not limited in any sense to the form of embodiment which has been described and illustrated and which has been given solely by way of example.

What we claim is:

1. Device for providing a leak-tight coupling between the handling grab of a master-slave manipulator and a control arm, the movements of the grab jaws being carried out by means of a traction cable which passes axially through said arm, characterized in that said device comprises in combination an intermediate bushing on which is fixed externally a flexible protection hose surrounding said arm, said being made fast at the lower end thereof with a deformable diaphragm designed to support axially of said arm a coupling member provided with two cylindrical extensions on each side of said diaphragm, said bushing being partly engaged within a casing constituting the grab body and locked in said casing by means of a first set of balls which are adapted to cooperate with an annular sleeve which surrounds said casing externally thereof, a transmission member which is secured to said annular sleeve by means which traverse said casing through lateral slots, a bottom locking-unit body which rests on a shoulder provided at the extremity of said transmission member and which secures said transmission member to the lower extension of said coupling member by means of a socket and a second set of balls, a top locking-unit body engaged within the extremity of the bushing and securing said bushing to the extremity of said arm by means of a third set of balls and an internal ring, said control cable having an extension in the form of a rigid rod which is coupled by means of a fourth set of balls and an annular retaining flange to the upper extension of said coupling member.

2. Leak-tight coupling device in accordance with claim 1, characterized in that said annular sleeve delimits between said sleeve and the external surface of said casing a recess for a restoring spring which is applied at one end against a bearing surface formed within said sleeve and at the other end against a stationary annular flange which forms part of said casing.

3. Leak-tight coupling device in accordance with claim 1, characterized in that said annular sleeve is provided in the internal surface thereof with a recess so as to permit the balls of said first set to escape in the disengaged position resulting from the sliding motion of said sleeve against the external surface of said casing, said disengagement of the balls of the first set being intended to take place simultaneously with the disengagement of the balls of said second set by means of said transmission member.

4. Leak-tight coupling device in accordance with claim 1, characterized in that said rod which forms an extension of said control cable is provided with a cylindrical end cap which is adapted to fit over the upper extension of said coupling member.

5. Leak-tight coupling device in accordance with claim 1, characterized in that said bushing is integral with a bearing ring which produces the disengagement of said rod as a result of traction applied to said cable and the disengagement of said annular retaining flange as a result of escape of the balls of the fourth set.

6. Leak-tight coupling device in accordance with claim 1, characterized in that said internal ring constitutes an abutment for said cylindrical cap so as to produce the disengagement of said bushing from said top locking-unit body as a result of escape of the balls of said third set.

References Cited by the Examiner

UNITED STATES PATENTS 2,229,800    1/1941    Dean _____ 294—106
3,171,285    3/1965    Tuft _____ 74—18.2

FOREIGN PATENTS 825,553    12/1959    Great Britain.

FRED C. MATTERN, JR., *Primary Examiner.*

W. S. RATLIFF, *Assistant Examiner.*